(12) United States Patent
McLennan et al.

(10) Patent No.: US 7,680,948 B2
(45) Date of Patent: Mar. 16, 2010

(54) METHOD AND SYSTEM FOR AUTOMATIC MODIFIABLE MESSAGES

(76) Inventors: James McLennan, 18 Belgrave Ave., Gidea Park, Romford, Essex RM26QD (GB); Martin Davey, 5 Pine Close, Leighton Buzzard, Bedfordshire, LU73DH (GB)

( * ) Notice: Subject to any disclaimer, the term of this patent is extended or adjusted under 35 U.S.C. 154(b) by 1095 days.

(21) Appl. No.: 10/706,867

(22) Filed: Nov. 12, 2003

(65) Prior Publication Data
US 2005/0080643 A1 Apr. 14, 2005

(30) Foreign Application Priority Data
Oct. 9, 2003 (GB) .................................. 0323625.4

(51) Int. Cl.
*G06F 15/16* (2006.01)
(52) U.S. Cl. ...................... 709/232; 709/202; 709/206; 709/246
(58) Field of Classification Search ......... 709/202–203, 709/206–207, 232, 246; 704/2–7
See application file for complete search history.

(56) References Cited

U.S. PATENT DOCUMENTS

| | | | |
|---|---|---|---|
| 5,535,120 A | 7/1996 | Chong et al. | |
| 5,657,461 A | 8/1997 | Harkins et al. | |
| 5,884,246 A * | 3/1999 | Boucher et al. | 704/2 |
| 5,960,080 A * | 9/1999 | Fahlman et al. | 704/2 |
| 6,009,462 A * | 12/1999 | Birrell et al. | 709/206 |
| 6,104,500 A | 8/2000 | Alam et al. | |
| 6,195,094 B1 | 2/2001 | Celebiler | |
| 6,272,482 B1 | 8/2001 | Ehnebuske et al. | |
| 6,438,584 B1 * | 8/2002 | Powers | 709/206 |
| 6,505,236 B1 * | 1/2003 | Pollack | 709/206 |
| 6,826,443 B2 | 11/2004 | Makinen | |
| 7,162,514 B2 * | 1/2007 | Hirai | 709/206 |

(Continued)

FOREIGN PATENT DOCUMENTS

WO   WO 01/06433   1/2001

(Continued)

OTHER PUBLICATIONS

"Microsoft Outlook Basics" SLA IT, Jun. 9, 2001, XP002282435 pp. 9-16,33—pp. 43,49-55.

(Continued)

*Primary Examiner*—Bharat N Barot
(74) *Attorney, Agent, or Firm*—Robert W J. Usher

(57) ABSTRACT

A method and system automatically providing responses to a recipient stores data relating to the recipient in a data store, the data being gatherable from one, some or all of written communications, mail, telephone, the Internet, servers, telephone voice, data and text messages, and other files and data sources. An initial automatic communication is formed, and passed to a modifying console for possible modification to form a final communication. Modifications can include: doing nothing; deleting material; adding new material; adding material of predetermined fixed content; adding material of predetermined alterable content; and altering material. The final communication can be provided on one, all or some of the Internet, servers, the telephone system in the form of text, voice and data messages, and as mail for posting or mailing. The final communication can be in a selectable language, for a selectable jurisdiction and in a selectable idiom.

30 Claims, 15 Drawing Sheets

U.S. PATENT DOCUMENTS

| | | | |
|---|---|---|---|
| 7,277,951 B2 * | 10/2007 | Marriott et al. | 709/228 |
| 7,409,333 B2 * | 8/2008 | Wilkinson et al. | 704/2 |
| 2002/0042846 A1 | 4/2002 | Bottan et al. | |
| 2003/0146926 A1 | 8/2003 | Valdes | |
| 2003/0158848 A1 | 8/2003 | Finney | |
| 2003/0217109 A1 | 11/2003 | Ordille et al. | |
| 2005/0078658 A1 | 4/2005 | McLennan et al. | |
| 2005/0081163 A1 | 4/2005 | McLennan et al. | |
| 2005/0129191 A1 | 6/2005 | Kokko et al. | |

FOREIGN PATENT DOCUMENTS

| | | |
|---|---|---|
| WO | WO 01/06433 A | 1/2001 |

OTHER PUBLICATIONS

Freed J: "Using Microsoft Outlook A Beginner's guide Email and Calendars" Microsoft Outlook, Sep. 19, 2002, pp. 1-19, XP002302480 the whole document.

"Screen shots" Lotus Notes 6, Jun. 9, 2003, pp. 1-5, XP002302479 the whole document.

"Lotus Notes (R5) Client calendaring" Screen Shots, Nov. 2, 2001, XP002302478 the whole document.

Alta Vista : Babel Fish (http://babelfish.altavista.com).

Search Report for PCT/GB2004/004282 citing above references, completed Jan. 20, 2005.

Australia Patent Office examiner's report mailed/dated Sep. 11, 2009.

* cited by examiner

METHOD AND SYSTEM FOR AUTOMATIC MODIFIABLE MESSAGES

FIELD OF THE INVENTION

The present invention relates to a method and system for creating and sending automatic communications to be used and modified whenever automated and reasoned communication is to be provided on the basis of requirement or desire.

BACKGROUND OF THE INVENTION

Many businesses require that communication be provided when certain events occur. One such example is the insurance business, where annual renewal notices and offers require to be sent. Another such example lies with the banking business, where communications concerning accounts require to be provided when certain events occur to accounts, such as exceeding overdraft limits. Another example is to be found in Internet trading, where a customer may provide details and requirements to which a response is required. Yet another example is to be found in share, commodities and options trading, where a contract of some kind may be required. Another such example is to be found where a contract is required which has been tailored to individual needs and circumstances.

In other circumstances, it may be required that a plurality of recipients be contacted, for example in an opinion poll, or to receive advertising or any other offer or promotion.

The present invention seeks to provide a method and means whereby such communication can readily be set up and provided.

One communication recipient may prefer one medium of communication, while another communication recipient may prefer another. The present invention seeks to provide ready means to provide communication on whatever medium the recipient prefers.

The exact nature and style of a communication depends upon which medium is being employed. One medium may require a full and formal approach. Another medium may favour an informal approach. The present invention seeks to provide means whereby the message can automatically be styled and selected to suit each medium.

The required language of a message varies from individual communication recipient to individual communication recipient. In Europe, for example, organisations may be required to provide communication in many different languages. The present invention seeks to provide means whereby the language can readily and automatically be matched to the recipient.

The required idiom of a message also varies from individual communication recipient to individual communication recipient. Formal language may be appropriate for some recipients. Informal language may be more appropriate for others. The present invention seeks to provide method and means whereby the idiom of a message can be matched with the appropriate idiom requirements of the individual recipient.

The exact content of a communication can depend upon within which legal jurisdiction a recipient is situated. A contract, acceptable within one territory, may not be acceptable within another. A different set of terms and conditions may be required. One prime example of this situation is to be found in the United States of America, where every State and territory has its own legal code. Another example is to be found within the European Union, where each member state has its own laws and peculiarities. Variation can even occur within a state. The United Kingdom, for example, has separate legal systems in a) England and Wales, b) Scotland and c) Northern Ireland. Added to that, the United Kingdom also has the territories of the Isle of Man and the Channel Islands, which are legally separate and do not even belong to the European Union. Switzerland has all of its separate Cantons. Germany has all of its states and Italy all of its regions. The list is endless and poses a problem which the present invention seeks to overcome with the minimum of inconvenience.

The construction, activation and direction of automated communication messages has been a difficult task, more appropriate, until now, to the Information Technology department of an organisation than to any other. The need for inter-departmental consultation meant that the process was slow, and that the resultant communication process often lacked desirable features. The present invention seeks to provide method and means whereby automated messages can easily, rapidly and comprehensively be created, allowing other more directly involved individuals to take control of the process, and also allowing organisations, too small or specialised to have an Information Technology department, to avail themselves of automated communication.

Automated communication often requires that a standard document needs additions made thereto. One such situation arises where a stock or share trading deal requires to be supported by a contract where certain features must be selected by the trader making the deal. There is a risk of errors or unwanted content creeping in to the completed contract. A similar situation appears where an inexperienced, unqualified or semi-qualified individual is involved with a contract or other document. The present invention seeks to provide a method and means whereby the risk of error and of inclusion of unwanted content is minimised.

SUMMARY OF THE INVENTION

To summarise, the present invention seeks to provide a universally applicable method and means of constructing and conducting automated communication on a plurality of media.

According to a first aspect, the present invention consists in a method for directing an automatic communication to a recipient, said method including the steps of: storing data, relating to the recipient, in a data store; examining the stored data to determine if a communication is to be provided to the recipient; if a communication is to be provided to the recipient, extracting the stored data relating to the recipient from the data store; automatically composing an initial communication in response to the stored data; passing the initial communication to be modified to become a final communication; and sending the final communication to the recipient.

According to a second aspect, the present invention consists in a system for directing an automatic communication to a recipient, said system comprising: a data store for storing data relating to the recipient; examination means, operable to examine the stored data to determine if a communication is to be provided to the recipient; data extraction means, operable, if said examination means determined that a communication is to be provided to the recipient, to extract the stored data relating to the recipient from said data store; initial communication composition means, operable to compose an initial communication in response to the stored data; modification means, operable to modify the initial communication to become a final communication; and message transmission means, operable to send the final communication to the recipient.

The various aspects of the invention also provide that passing the initial communication to be modified to become a final communication can selectable in response to the extracted stored data.

The various aspects of the invention also provide that modifying the initial communication can comprise changing only a predetermined portion of the initial communication.

The various aspects of the invention also provide that modifying the initial communication can comprise modifying the initial communication in a manner selected in response to the extracted stored data.

The various aspects of the invention also provide that modifying the initial communication can include at least one of: doing nothing to the initial communication; deleting material from the initial communication; adding new material to the initial communication; adding material of predetermined fixed content to the initial communication; adding material of predetermined alterable content to the initial communication; and altering material already provided in the initial communication.

The various aspects of the invention also provide for selecting, in response to the stored data, at least one medium from among a plurality of selectable media for providing the final communication to the individual; and employing the or each of the selected medium to send the final communication.

The various aspects of the invention also provide that the plurality of selectable media can include: facsimile transmission; telephonic text messaging; data transmission; Internet Communication; and mailing of printed letters.

The various aspects of the invention also provide that storing data relating to the recipient can include accepting data from at least one of: the Internet; a digital data transmission medium; telephonic text messages; telephonic voice messages; printed matter; other data files; and record data files.

The various aspects of the invention also provide that composing an initial communication in response to the stored data can include composing the initial communication in a selectable one of a plurality of languages, the particular one of the plurality of languages being selected in response to the extracted stored data relating to the recipient.

The various aspects of the invention also provide that modifying the initial communication can comprise modification in the same language as said initial communication.

The various aspects of the invention also provide that composing an initial communication in response to the stored data can includes the step of selecting one of a plurality of idioms for the initial communication, the particular idiom being selected in response to the extracted stored data relating to the recipient.

The various aspects of the invention also provide that modifying the initial communication can comprise modification in the same idiom as the initial communication.

The various aspects of the invention also provide that composing an initial communication in response to the stored data can include the step of composing the communication in a form suitable for use in a selectable one of a plurality of jurisdictions, the particular one of the plurality of jurisdictions being selected in response to the extracted stored data relating to the recipient.

The various aspects of the invention also provide that modifying the initial communication can comprise modification with material suitable for use in the same jurisdiction as the initial communication.

BRIEF DESCRIPTION OF THE DRAWINGS

The invention is further explained, by way of an example, by the following description, read in conjunction with the appended drawings, in which:

FIG. 17 shows, by way of an example, a fourth screen which would be presented to the compiler during, for example, testing of the response template.

And

Figure 18:
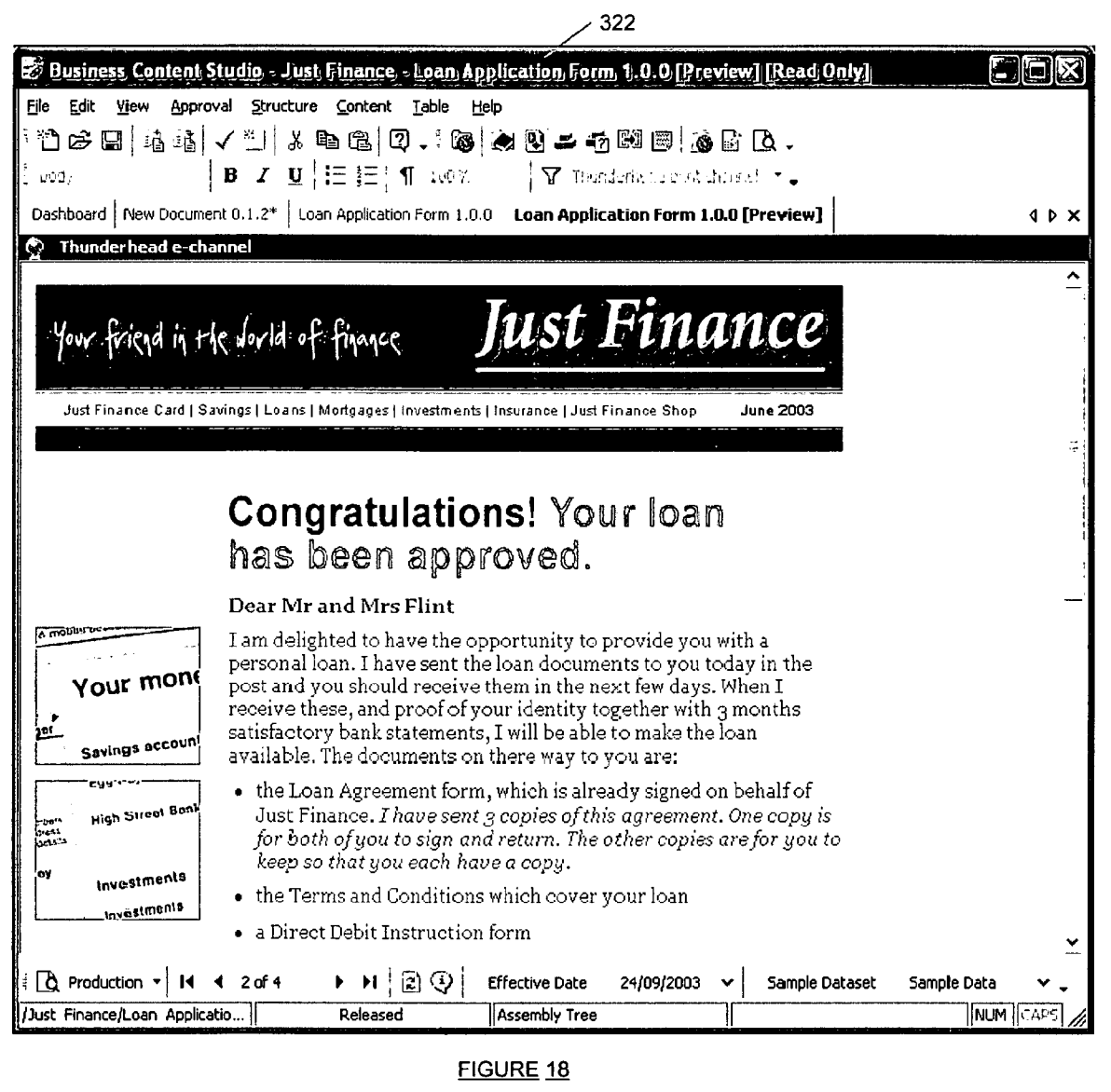

FIG. 18 shows a fifth screen, showing further material which can be added if a further criterion definition is met.

PARTICULAR DESCRIPTION

Figure 1:
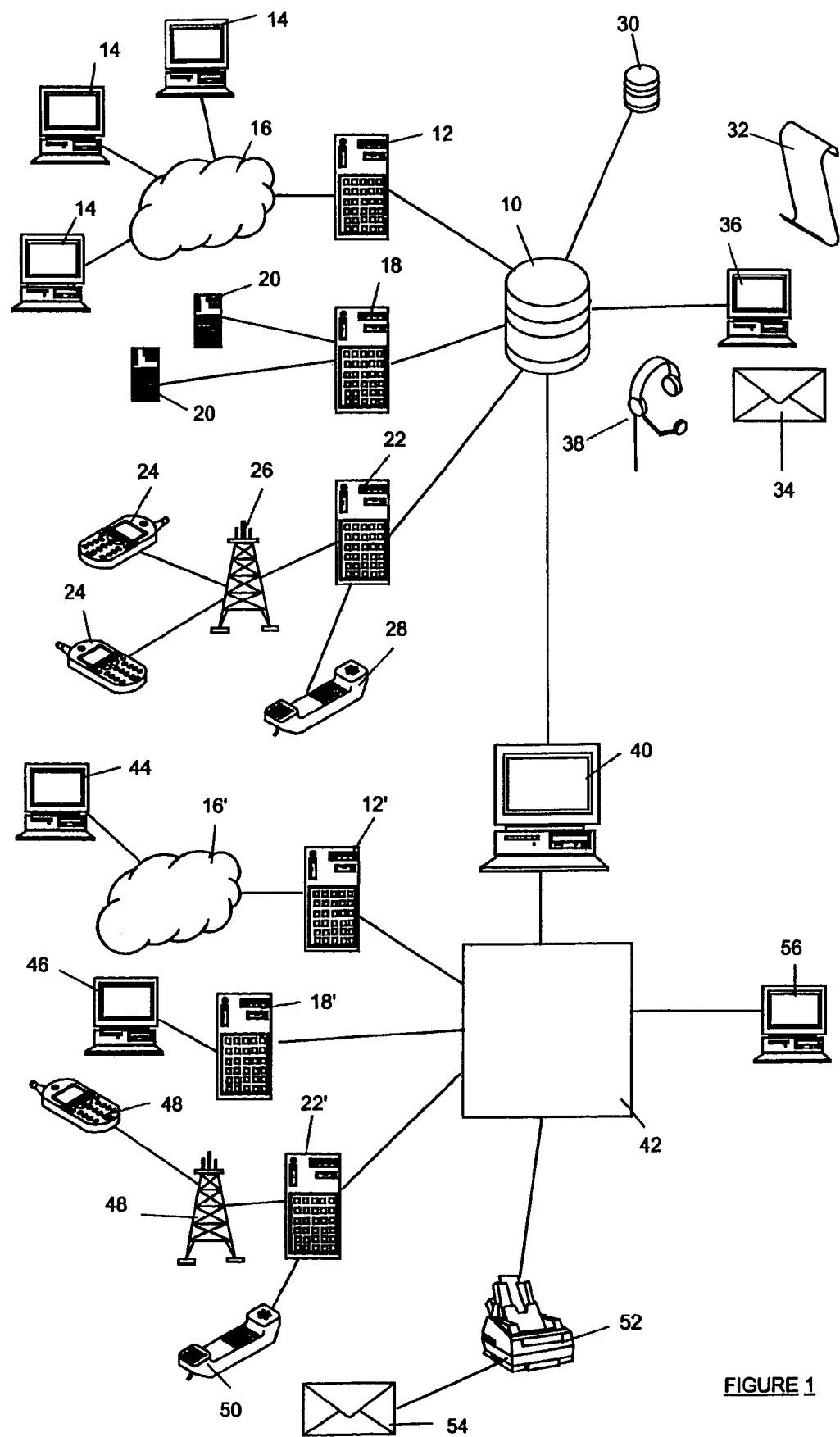
FIG. 1 shows a schematic view of a non-restrictive example of the type of environment where the present invention can be applied.

Attention is first drawn to FIG. 1 showing a schematic view of the type of environment where the present invention can be applied.

A data store 10 can receive data from various sources. The data store 10 can receive written data from an Internet server 12 which derives data from Internet client 14 connected to the data store through the Internet 16. The sort of data which may be derived by the data store 10 from the Internet server 12 could be, as a set of non-restrictive examples, biographical or financial data filled in on a form, credit card numbers, birthdays, details of children and relatives, details of nationality, names and addresses, bids at auction, and so on. The data derived from the Internet server 12 will be any data for which some kind of response is required.

The data store 10 can also receive data from a branch server 18 which communicates with remote servers 20 which can be situated in remote locations. An example of such remote servers would be, for example, servers connected with the individual branches of a bank, store or insurance company. Once again, the branch server 18 provides the data store 10 with data to which some kind of response should be generated.

The data store 10 can also receive data from a telephone server 22 operative to receive text messages from mobile telephones 24 coupled to the telephone server 22 by means of radio mast 26. The telephone server 22 is also coupled to communicate with landline telephones 28. While the telephone server 22 is here described as handling text messages, it is to be appreciated that telephones 24, 28 are becoming progressively more sophisticated and can pass messages in many different forms of code. The present invention encompasses the ability of telephones 24, 28 to pass messages in any of the many forms of code which have become possible and which will become possible. The present invention also encompasses the possibility that automatic computerised voice decoding can be used to decode voice messages into a form usable by the data store 10.

The data store 10 can also receive data from other data sources 30. Other data sources 30 can be, for example, demographic and biographic data concerning individuals, their families and associations. A very good example of such data is to be found in the United Kingdom where copies of telephone directories or voters' registers, complete with addresses, can be purchased.

The data store 10 can also receive data from written communications 32 or mail 34 which can be entered by an operator at an input console 36. Equally, the operator at the input console 36 can input data to the data store from conversation via a telephone line 38.

The data store 10 is accessed by a processor 40 which supervises a communications package 42. The communications package 42 provides communications, according to the details of the data store 10, for individuals in the mode that the individual prefers. The communications package 42 can send a message to a recipient via the recipient's personal computer 44 connected to the Internet 16' through an Internet server 12'. Equally, the communications package 42 can send a message to a recipient processor 46 via a branch server 18'. Likewise, the communications package 42 can communicate via the telephone server 22' to deliver text or voice messages to a recipient mobile telephone 48 or a recipient landline telephone 50. The message sent from the communications package 42 can be a text message, or can be a voice message encoded by a voice encoder.

The communications package 42 may also send text material to a printer 52 which creates mail 54 to be posted to a message recipient.

Optionally, in some circumstances, the whole of a message cannot be compiled automatically by the communications package 42 and, for example where a contract must have terms inserted, must be modified and the correct terms provided before the communications package 42 can release the message for sending to the recipient. This is done by means of one or more modifying consoles 56. The nearly complete message is sent to the modifying console 56 which inserts the necessary terms and sends the message back to the communications package 42 for completion of the transmission process.

The arrangement, shown in FIG. 1, is applicable to virtually any process where an organisation is required to respond to an approach or an event. The arrangement shown in FIG. 1 can automatically process orders received from customers, can send out reminders and renewals for insurance companies, can provide balance sensitive information (such as overdraft warnings) to bank clients, can remind people that they are due for medical treatment, court appearances and a host of other things. The versatility and utility of the invention will become apparent as the preferred embodiment is described with respect to FIG. 1 and the subsequent drawings.

The documents, created using the preferred embodiment of the invention, for preference use XML (extensible Markup Language), which is a widely used system for defining data formats. XML provides a very rich system to define complex documents and data structures such as letters, invoices, molecular data, news feeds, glossaries, inventory descriptions, real estate properties, and so on. As long as a programmer has the XML definition for a collection of data (often called a "schema") then they can create a program to reliably process any data formatted according to those rules. The invention is not limited to using XML, and can use any language, languages, program or programs, scheme or schemes whereby a document can be assembled according to the activities hereinbefore and hereinafter described for the present invention.

The preferred embodiment of the present invention is described in terms of a letter-writing routine used, just for this example, in an insurance renewal situation. However, it is to be appreciated that the preferred embodiment of the invention can also encompass all of the uses and possibilities hereinbefore described.

Figure 2:
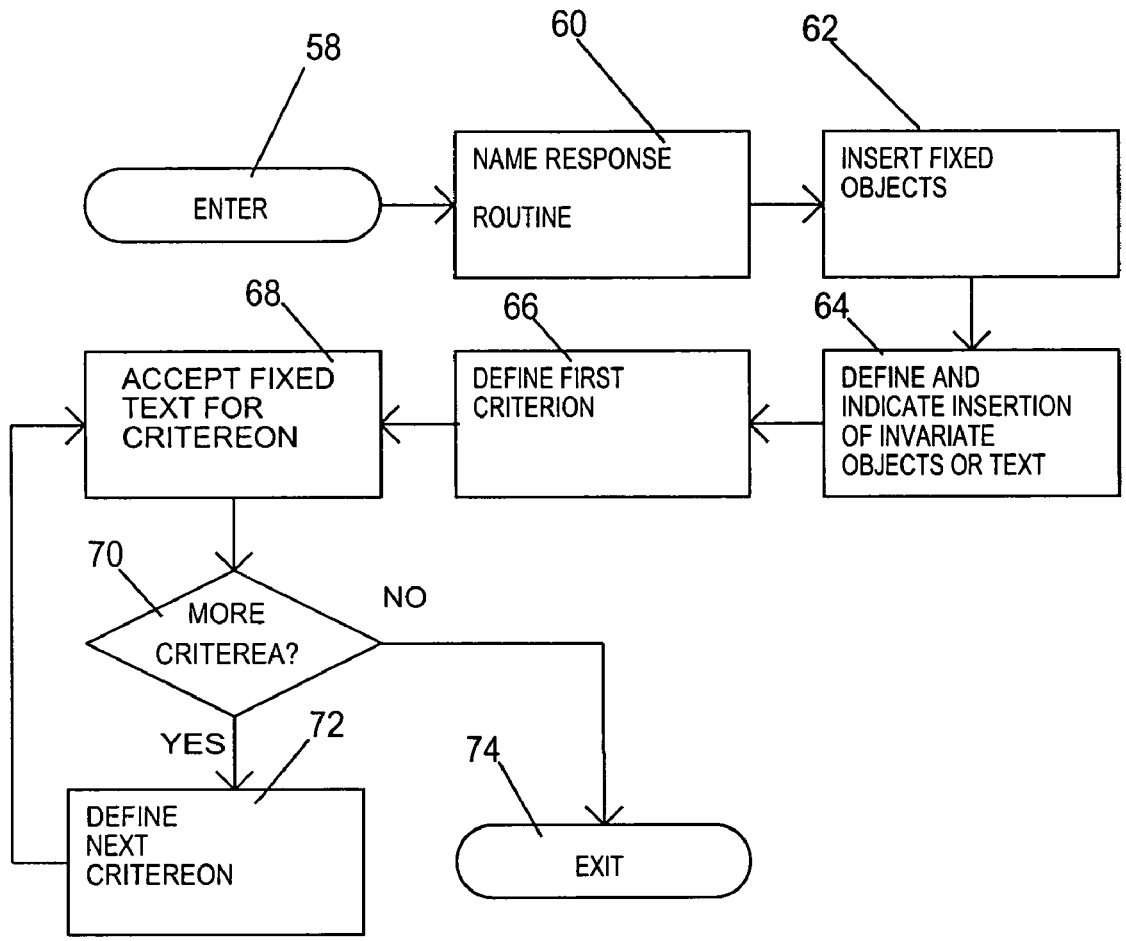
FIG. 2 is a flow chart which shows the process involved in creating a response routine.

Attention is next drawn to FIG. 2 which shows the process involved in creating a response routine.

FIG. 2 shows how, simply by way of the example of the preferred embodiment, an individual might make up an automatic routine.

From entry 58 a first operation 60 prompts the compiler to provide a name for the automatic response routine. Thereafter, a second operation 62 has the compiler insert fixed objects to be printed upon the page. Such fixed objects may be images of banners, and other elements of letterhead.

A third operation 64 then has the compiler define and indicate the points of insertion of invariate objects or text. Such invariate objects may be, in this instance, the name and address of the recipient or recipients, the number or numbers of insurance policies, the renewal date and so on. The invariate objects or text can also include pictures of individuals and so on.

Having set up the basic layout of the letter or communication, a fourth operation 66 prompts the compiler to provide a definition of a first criterion for selecting a body of text to be inserted into the letter. The criterion is assembled, as will be explained at a later point, according to a plain language logic statement. The first criterion could be that an insurance policy is due for renewal within the next month.

A fifth operation 68, once the first criterion has been defined, accepts the fixed text which is to be inserted into the letter should the first criterion be fulfilled. The fixed text can also include other printable or representable material such as images, advertising banners and the like.

If a first test 70 detects an indication from the compiler that more criteria are to be accommodated by the response, a sixth operation 72 has the compiler define the next criterion and return control to the fifth operation 68. If the first test detects that no more criteria are to be accommodated, control passes to exit 74.

FIG. 2 thus describes how a document can be assembled with different criteria prompting different contents.

Once the automatic response routine has been created, according to FIG. 2, it can be stored for later use, or sent elsewhere for use. The automatic response routine also contains within itself means to implement its provisions, including, but not limited to, interface and instruction routines operative to control the various types of equipment shown in FIG. 1.

Figure 3:
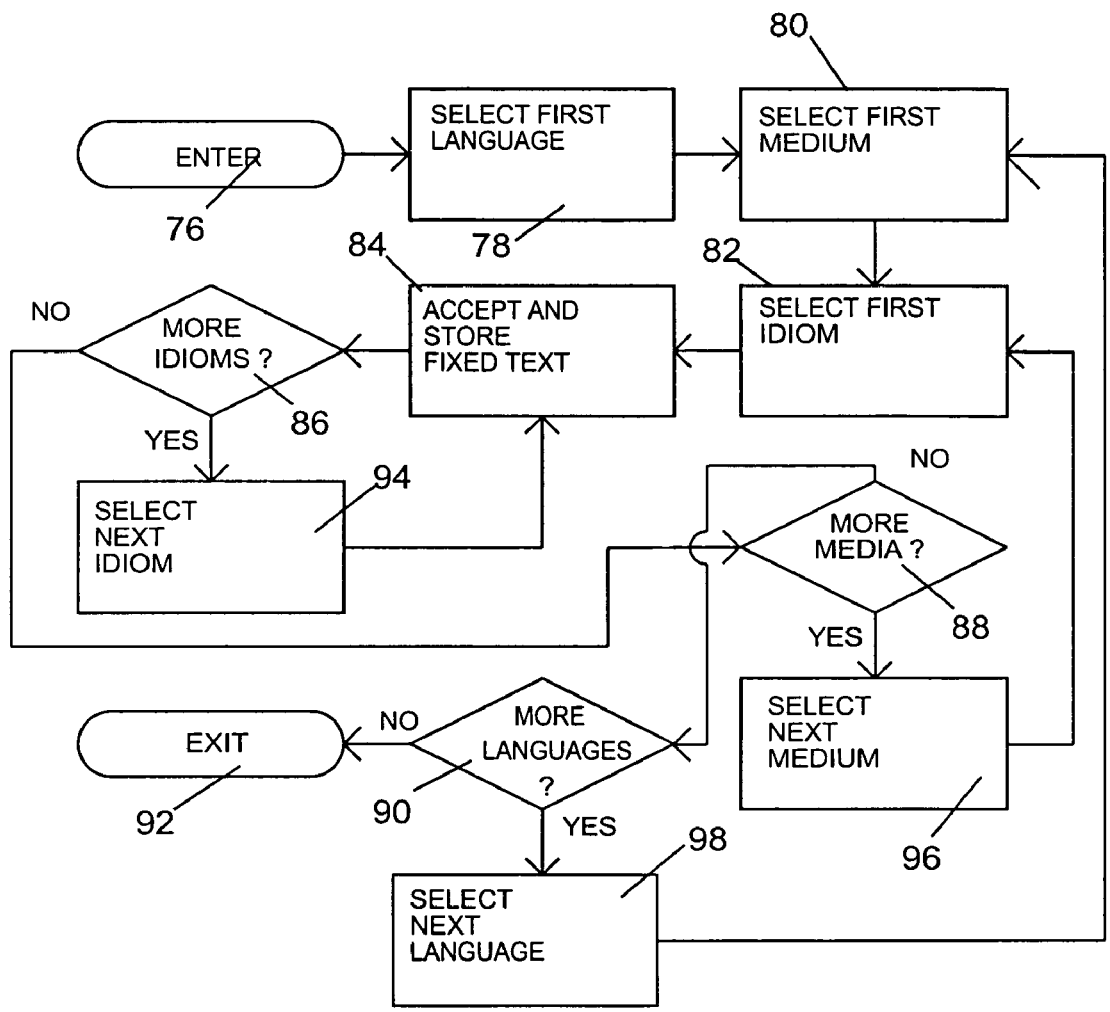
FIG. 3 is a flow chart showing one example of how the acceptance of fixed text for a criterion, otherwise shown in FIG. 2, can be used to provide varied options of fixed text to enhance the flexibility of the automatic response allowed by the present invention.

Attention is next drawn to FIG. 3 which is a flow chart showing one example of how the fifth operation 68 of FIG. 2 can be used to provide varied options of fixed text to enhance the flexibility of the automatic response allowed by the present invention.

From entry 76 a seventh operation 78 has the compiler select a first language in which a response is to be couched. An eighth operation 80 then has the compiler select a first medium by which the response is to be provided. A ninth operation 82 then has the compiler select which idiom is to be used.

By means of the seventh 78, eighth 80 and ninth 82 operations the compiler can select a language, a type of medium which is to bear the message, and a first idiom (either severe, moderate or friendly and so on).

As will be explained later, the compiler can also use the flow chart of FIG. 3 to select a one or more jurisdictions, each requiring different text, to which a particular fixed response is to be addressed.

Once these criteria have been selected, a tenth operation 84 then has the compiler provide the fixed text which is to be used should the particular criterion of FIG. 2 be met. The compiler types in, pastes in, or provides the text by any other means. The compiler can also edit the fixed text. The text is only fixed when the response routine is responding to stimuli.

Having accepted the fixed text, a second test 86 prompts the compiler to see if there are any further idioms required for that medium and that language. If not, a third test 88 looks to see if there are any more media which are to be accommodated in that language and for that idiom. If not, a fourth test 90 looks to see if any more languages are to be provided. If no more than one language is to be provided, control passes to exit 92.

If the second test 86 detects that the compiler requires further idioms to be provided, an eleventh operation 94 prompts the compiler to select the next idiom and passes control back to the tenth operation 84 to accept and store the fixed text in the next selected idiom.

If the third test 88 detects that more media are to be accommodated in that language and for that criterion, control passes from the third test 88 to a twelfth operation 96 which looks for the compiler to select the next medium and then passes control to the ninth operation 82 which looks for the selection of a first idiom for that medium and carries on as before.

If the fourth test 90 detects that more languages are to be used, a thirteenth operation 98 has the compiler select a next language and then passes control to the eighth operation 80 awaiting selection of the first medium which will be accommodated in the further language.

By the process of FIG. 3, a plurality of different fixed messages are made available for use in an automatic response, suitable for use with a plurality of media and in a plurality of languages.

Moving ahead, perhaps, a little, a language can be selected for an automatic response on the basis of a postal code, an idiom on the basis of a geographical area, and a medium on the basis of a data flag held within the data relating to the individual in the data store 10.

Figure 4:
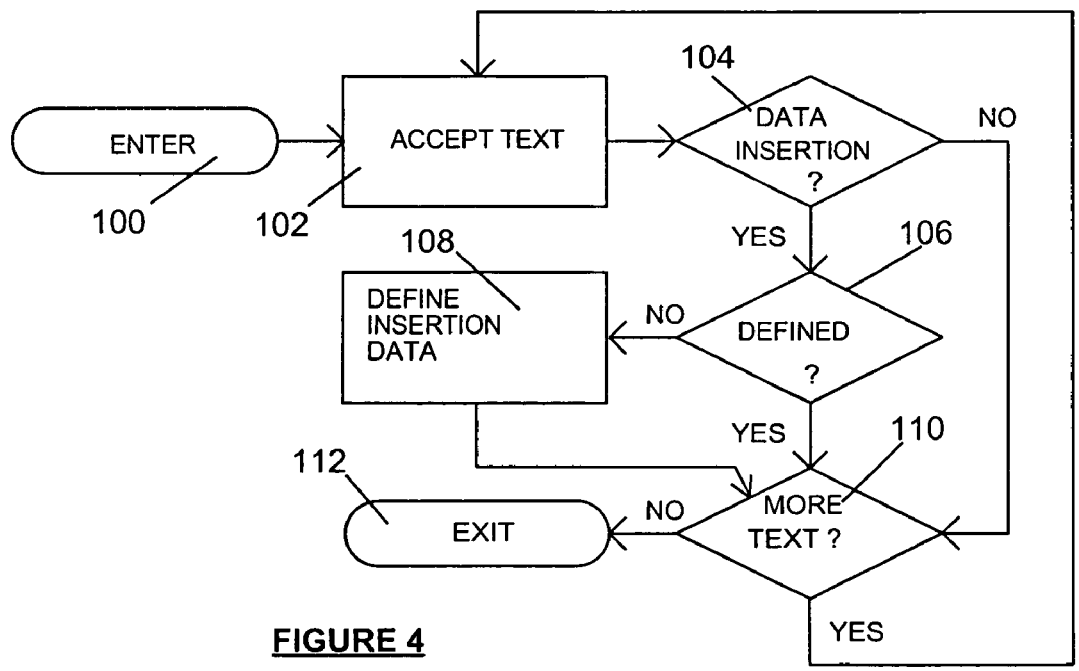
FIG. 4 is a flow chart giving an example of just one way in which the acceptance and storage of fixed text, otherwise shown in FIG. 3, can be accomplished.

Attention is next drawn to FIG. 4, a flow chart giving an example of just one way in which the tenth operation 84 of FIG. 3 can be accomplished.

From entry 100 a fourteenth operation 102 accepts the fixed text characters provided by the compiler. A fifth test 104 looks to see if an item of data is to be inserted into the midst of the fixed text. Such an item of data insertion might be the individual name of the recipient, the insurance policy number (as an example), the date of renewal of the insurance policy and so on.

If the fifth test 104 finds that data is to be inserted, that data being defined by words contained within brackets, control passes to a sixth test 106 which looks to see if the data item has been defined. The compiler is required to define the data item so that it may be retrieved from the data store for insertion. If the data item has not been defined, the sixth test 106 passes control to a fifteenth operation 108 which accepts the definition of the undefined data for insertion from the compiler. Control then passes to a seventh test 110.

Another option is for a data item to be externally defined when required. The data item is re-defined in a "building" stage using a building module, and then re-attached to the response template.

If the sixth test 106 discovers that the data to be inserted has already been defined, control also passes from the sixth test 106 to the seventh test 110.

The seventh test 110 looks to see if more text is to be provided for inclusion in the fixed text item. If yes, the seventh test 110 passes control back to the fourteenth operation 102. If not, the seventh test 110 passes control to exit 112.

The functioning of FIG. 4 shows how a fixed text response item can be assembled including insertion of relevant data to that text.

Figure 5:
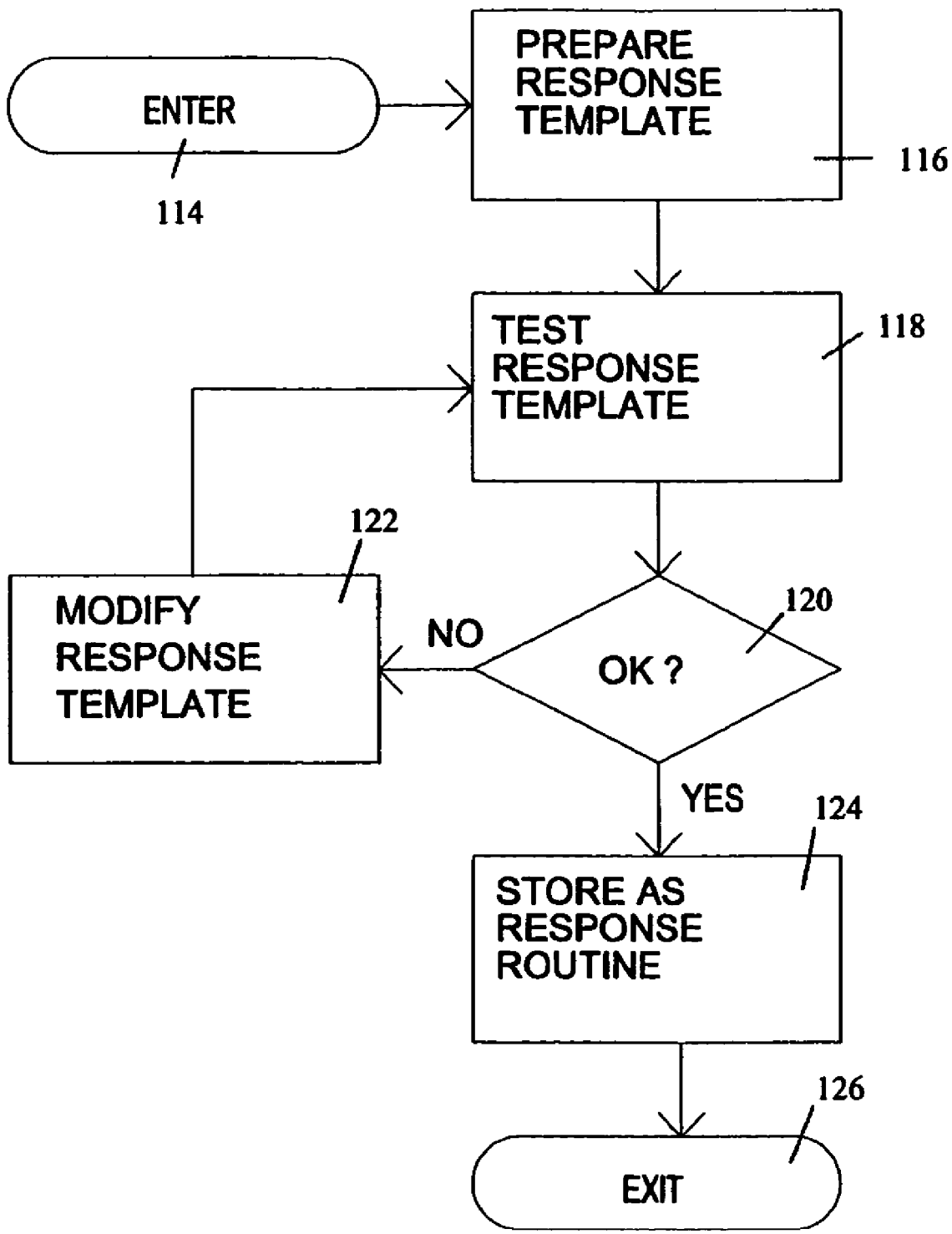
FIG. 5 is a flow chart showing how the human compiler completes the task of preparing an automatic response.

Attention is next drawn to FIG. 5 showing how the compiler completes the task of preparing an automatic response. From entry 114 a sixteenth operation 116 has the compiler prepare a response template. The sixteenth operation 116 is described, in much greater detail, in FIG. 2, FIG. 3 and FIG. 4.

Having prepared a prototype response template a seventeenth operation 118 allows the compiler to test the response template against trial data.

If an eighth test 120 finds that the compiler is dissatisfied with the automated response template an eighteenth operation 122 allows the compiler to modify the automated response template, passing control back to the seventeenth operation 118 for further testing.

Once the compiler is content that the automated response template is acceptable, the eighteenth operation 120 passes control to an nineteenth operation 124, and stores the prepared response template as a response routine which can be called up and used at any time. Control then passes to exit 126.

The processes shown in FIG. 5 allow the compiler to fine tune the automated response template until it performs as required.

Figure 6:
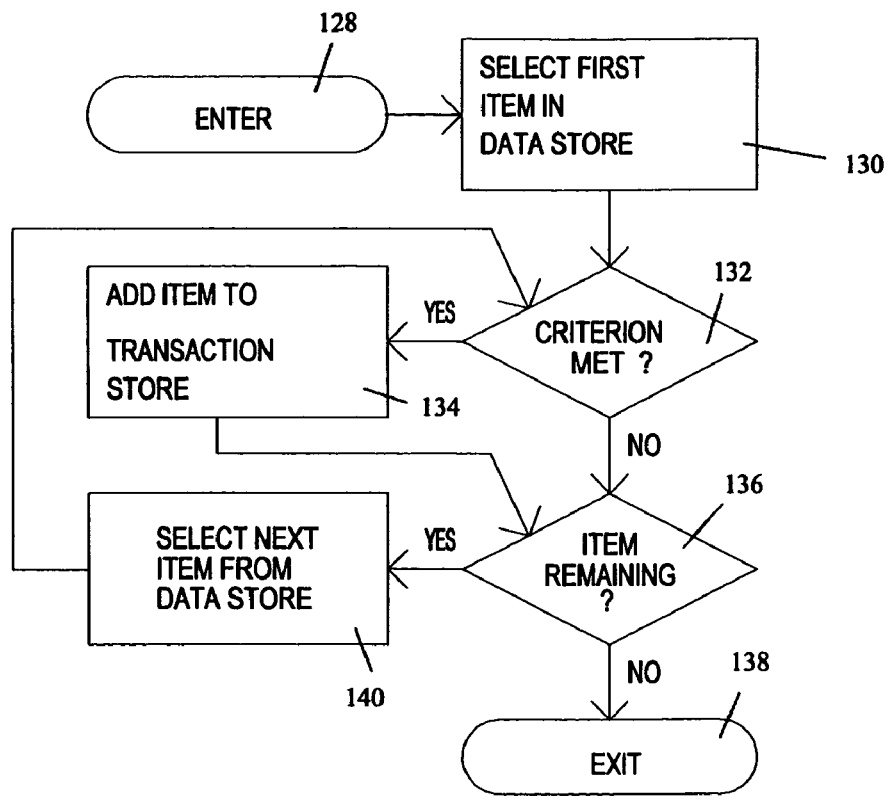
FIG. 6 is a flow chart showing how the present invention is used to provide an automated response.

Attention is next drawn to FIG. 6, showing a flow chart of how the present invention is used to provide an automated response.

From entry 128 a twentieth operation 130 interrogates the data store 10 and selects the first item therein. A ninth test 132 then checks to see if the first item accessed from the data store 10 meets the criterion for inclusion in providing an automated response. If the ninth test 132 detects that the criterion for an automated response is met, a twenty-first operation 134 adds the selected item in the data store to a transaction store ready for processing. The twenty-first operation 134 then passes control to a tenth test 136. If the ninth test 132 detects that the particular selected item from the data store 10 does not meet the criterion, the ninth test 132 also passes control directly to the tenth test 136.

If the tenth test 136 detects that no item is remaining in the data store 10 for testing whether it passes the criterion for automated processing on this occasion, the tenth test 136 passes control to exit 138. If the tenth test 136 detects that there are items remaining to be tested for processing criterion in the data store 10, it passes control to a twenty-second operation 140 which selects the next item from the data store 10 and passes control back to the ninth test 132.

The processes described in FIG. 6 show how items from the data store 10 are selectively passed to a transaction store for automated processing.

Figure 7:
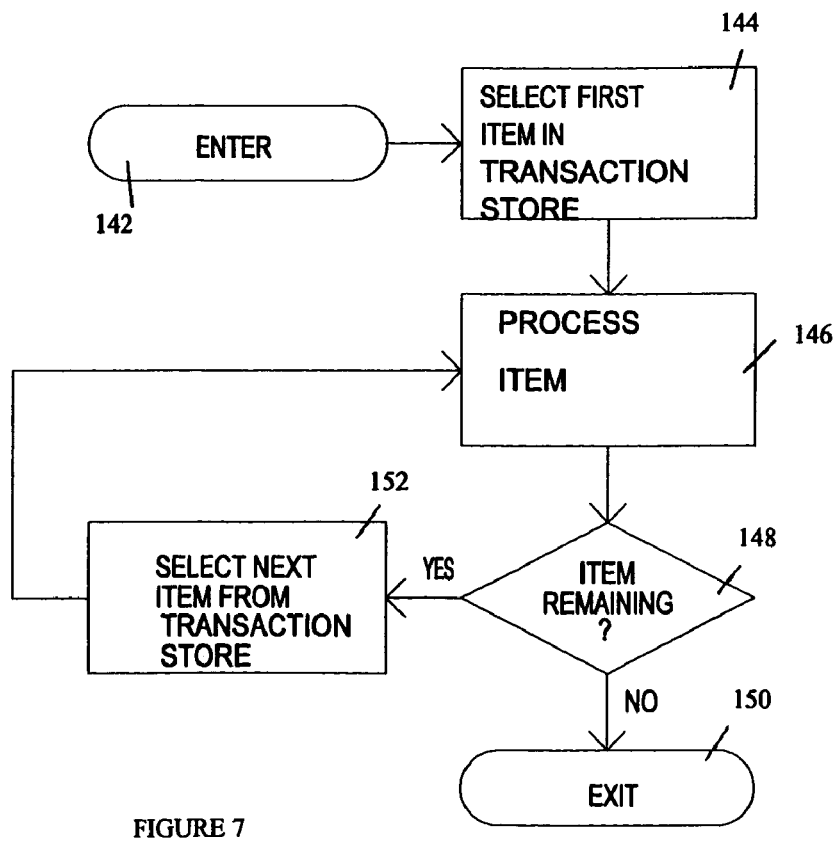
FIG. 7 is a flow chart showing how an automated response run is conducted, using the present invention.

Attention is next drawn to FIG. 7 which shows a flow chart of how an automated response run is conducted, using the present invention.

From entry 142 a twenty-third operation 144 selects the first item in the transaction store and passes control to a twenty-fourth operation 146 which processes that item to provide a unique response in an automated fashion for that item.

An eleventh test 148 then looks to see if any item is remaining in the transaction store unprocessed. If not, control passes to exit 150.

If the eleventh test 148 detects that a further item is still in the transaction store unprocessed, control is passed to a twenty-fifth operation 152 which selects the next item from the transaction store and passes control to the twenty-fourth operation 146 for that next item to be processed.

By the process depicted in FIG. 7, all of the items in the data store 10 which are due to be the subject of an automated response, on this occasion, are responded to one by one.

Figure 8:
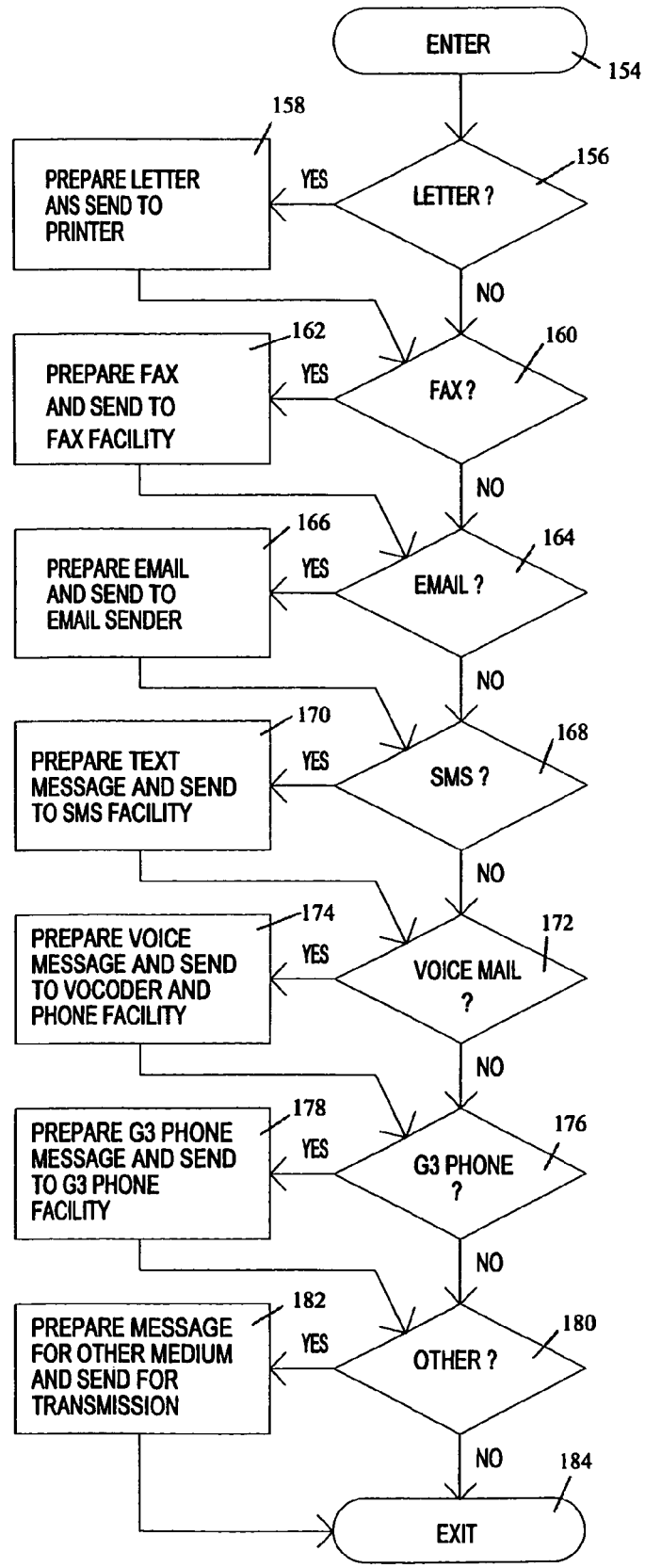
FIG. 8 is a flow chart showing a first stage in the preparation of an automated response.

Attention is next drawn to FIG. 8, showing a flow chart indicating a first stage in the preparation of an automated response.

From entry 154 a twelfth test 156 looks to see if a flag in the data held in the data store 10 indicates that a letter is required in the automated response. If so, a twenty-sixth operation 158 prepares the letter and sends the letter to be printed and posted.

Control then passes to a thirteenth test 160 which looks to see if a facsimile communication is required in the automated response routine. If so, a twenty-seventh operation 162 prepares an appropriate response for sending by facsimile and sends the response to a facsimile sending facility.

Control then passes to a fourteenth test 164 which determines whether or not an email is required in the automated response routine. If so, a twenty-eighth operation 166 prepares a response suitable for transmission by email and sends that response to the email sender or server to be sent to the recipient.

Control then passes to a fifteenth test 168 which checks to see if a text message (short message service message) response is required to be sent to the recipient of the automated response. If so, a twenty-ninth operation 170 prepares a suitable SMS text message and sends the text message to a sending facility to be sent to the recipient.

Control then passes to a sixteenth test 172 which checks to see if a voice mail response is to be provided to the recipient. If so, a thirtieth operation 174 prepares a text message suitable for creating a voice mail, and sends that text message to a voice encoder which converts the text for speech. The speech is then sent to a telephone facility for transmission to the recipient.

Control then passes to a seventeenth test 176 which looks to see if a message, suitable for transmission on a Group 3 video telephone is to be provided for the recipient of the automated response. If so, a thirty-first operation 178 assembles a response including text and images, and possibly voice or sound, which is assembled and sent to a Group 3 telephone message transmission facility.

Control then passes to an eighteenth test 180 which is here designated as looking to see if any other medium is to be employed to provide communication with the recipient of the automated response. The other media are any media whatsoever that can be automatically employed to communicate with the recipient if so required. The present invention encompasses using any other medium which can be employed. If the eighteenth test 180 detects that some other medium is required, a thirty-second operation 182 will prepare a suitable response for use with the other medium and send that response for transmission.

Control then passes to exit 184.

By the processes illustrated in FIG. 8, a response can be prepared for one, some or all of the different media described. The invention encompasses using a smaller set of different media from those shown in FIG. 8, and also comprises using a larger set than that shown.

Figure 9:
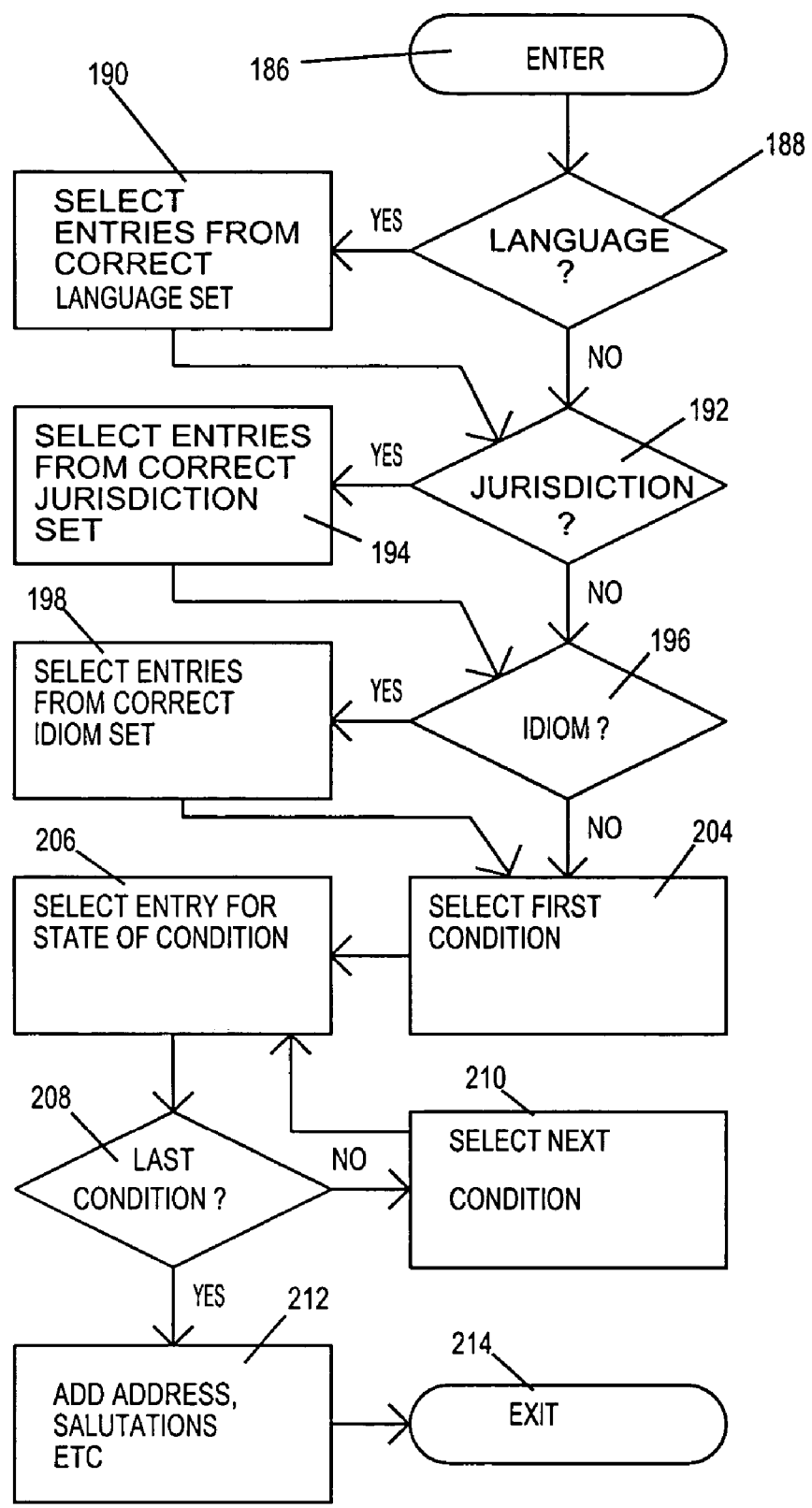
FIG. 9 is a flow chart which shows, by way of example, the way in which a message is prepared for sending to each of the different media, as shown in FIG. 8.

Attention is next drawn to FIG. 9 which shows, by way of example, the way in which a message is prepared in FIG. 8 in the twenty-sixth operation 158, the twenty-seventh operation 162, the twenty-eighth operation 166, the twenty-ninth operation 170, the thirtieth operation 174, the thirty-first operation 178 and the thirty-second operation 182.

From entry 186 a nineteenth test 188 checks to see which language is to be used in the automated response. The language may be indicated by the postal code of the address of the recipient, by the name of the town where the recipient lives, by a flag included in the data held for that recipient in the data store 10, or by any other convenient means. If a choice of languages is provided, a thirty-third operation 190 causes the fixed content elements of the automated response to be chosen from the appropriate language set.

A twentieth test 192 then checks to see which jurisdiction the recipient of the automated response occupies. Once again, the jurisdiction can be derived from the postal code of the recipient, the name of the town or state of the recipient, or by some flag held in the data in the data store 10 relating to that recipient. If a particular jurisdiction and choice of jurisdiction is indicated, a thirty-fourth operation 194 makes sure that the fixed content responses in the automated response are selected only from those entries which relate to the chosen jurisdiction.

Control then passes to a twenty-first test 196 which looks to see if any particular idiom is to be used for the automated response. The idiom may be indicated by the name of the town inhabited by the recipient, by a flag held in the data in the data store 10, or by any other means. If a particular choice of idiom is provided and is to be selected, a thirty-fifth operation 198 ensures that the entries made in the response are chosen from the fixed content entries in the appropriate idiom.

Control then passes to a thirty-seventh operation 204 then selects the first condition which is to be used to select an appropriate entry in the automated response. Such a first condition could be, simply by way of example, that an insurance premium is due to be renewed within the next month. Another such condition could be that the recipient has failed to renew an insurance premium in due time. All sorts of different reasons and conditions can be encompassed within the present invention for selecting a particular one of a plurality of fixed responses.

Control then passes to a thirty-eighth operation 206 which selects the particular fixed content entry to the automated response which is appropriate for the state of the particular condition under scrutiny. For example, an individual may have been turned down for insurance, or accepted for insurance. One or other appropriate responses will be selected.

A twenty-third test 208 then looks to see if any text insertion conditions remain. If it is not the last condition, a thirty-ninth operation 210 selects the next condition to be used for determining the fixed content entry to be inserted into the response, and passes control back to the thirty-eighth operation 206 to select the next entry.

If the twenty-third test 208 detects that the last condition has been processed, a fortieth operation 212 adds such elements as images, banners and fixed data to the automated response and passes control to exit 214.

The processes described in FIG. 9 can be conducted in different orders from that shown, and can include one, some or all of the different variations 188, 192, 196, 200 indicated. The invention also allows for further variations, such as selection of colours, type face, accents for sound messages, and so on, not otherwise shown in FIG. 9. The fixed content provided in the fortieth operation 212 can be added at the beginning of the compilation of the automated response, or during the different stages of the compilation of the automated response, other than that shown in FIG. 9.

Figure 10:
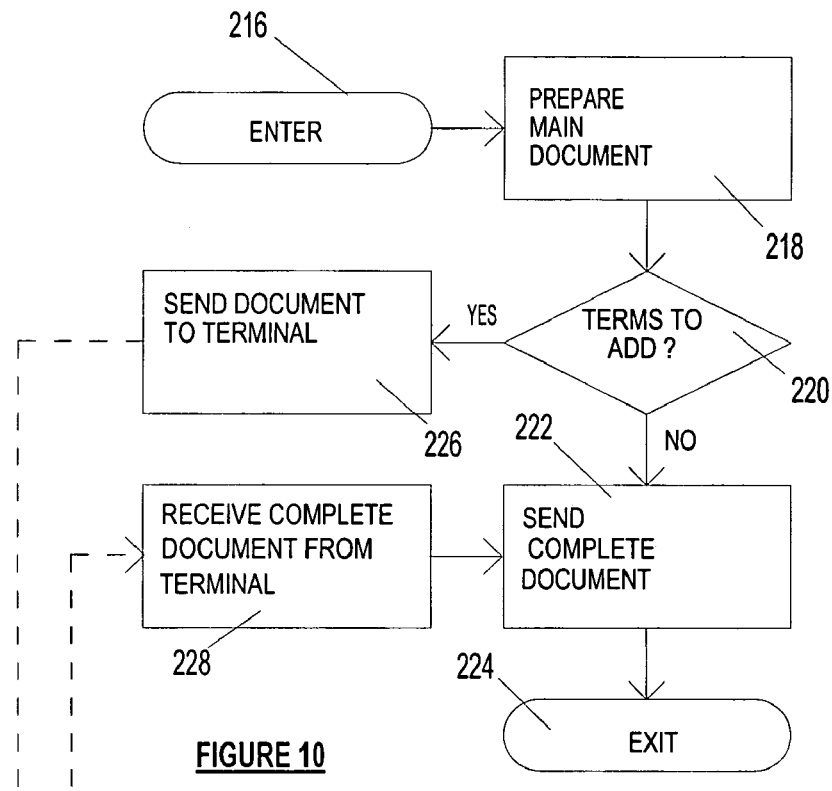
FIG. 10 is a flow chart showing what happens when an automatically prepared document requires to have alterations made to it under the supervision of an involved human operator who knows the probably complex variations required.

Attention is next drawn to FIG. 10 which is a flow chart showing what happens when an automatically prepared document requires to have alterations made to it under the supervision of an involved human operator who knows the probably complex variations required. FIG. 10 shows the operation of one type of alteration means, used to alter the fixed content of a response for transmission.

From entry 216 a forty-first operation 218 has the main document prepared according to the activities illustrated, by way of example, in FIGS. 8 and 9. A twenty-fourth test 220 then looks to see if human intervention of add terms is required. If not, a forty-second operation 222 sends the completed document for transmission to the recipient, and passes control to exit 224.

If the twenty-fourth test 220 detects that further terms require to be added, a forty-third operation 226 sends the document to the modifying console 56 otherwise shown in FIG. 1 for the operator to select and add the appropriate terms. When modified, a forty-fourth operation 228 accepts the completed document from the modifying console 56 and passes control to the forty-second operation 222 to send the complete document to the recipient.

Figure 11:
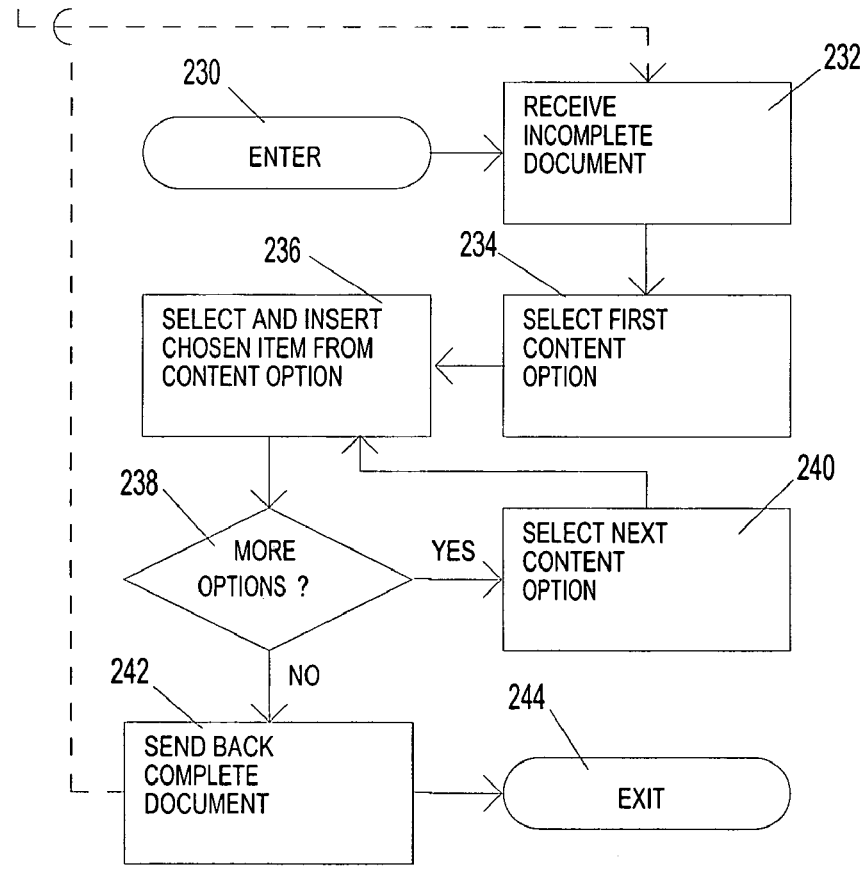
FIG. 11 is a flow chart illustrating the behaviour of the modifying console when employed by the processes shown in FIG. 10.

Attention is next drawn to FIG. 11 illustrating the behaviour of the modifying console 56 when employed by the processes shown in FIG. 10.

From entry 230 a forty-fifth operation 232 accepts the incomplete document from the forty-third operation 226 of FIG. 10 and a forty-sixth operation 234 selects the first option, on the semi-complete document, where the human operator of the modifying console 56 can select one or none of a plurality of fixed content inserts. A forty-seventh operation 236 then allows the human operator of the modifying console 56 to select one, none or some of the particular fixed content insert provided for that purpose. The fixed content textural inserts are provided by the processor 40 and cannot be changed by the human operator of the modifying console 56, merely inserted.

In another alternative, the human operator can also add new content, or, if pre-defined conditions allow, can amend selected content.

A twenty-fifth test 238 then looks to see if any more options exist in the semi-complete document for the operator of the modifying console 56 to select none, one or some of the fixed value content elements for that particular option. If so, a forty-eighth operation 240 selects the text content option location and passes control back to the forty-seventh operation 236 for the fixed content element to be selected and inserted (or not) for that option.

If the twenty-fifth test 238 detects that no further content options exist, a forty-ninth operation sends the now complete document back to the forty-fourth operation 228 of FIG. 10 for transmission to the recipient, and passes control to exit 244.

Figure 12:
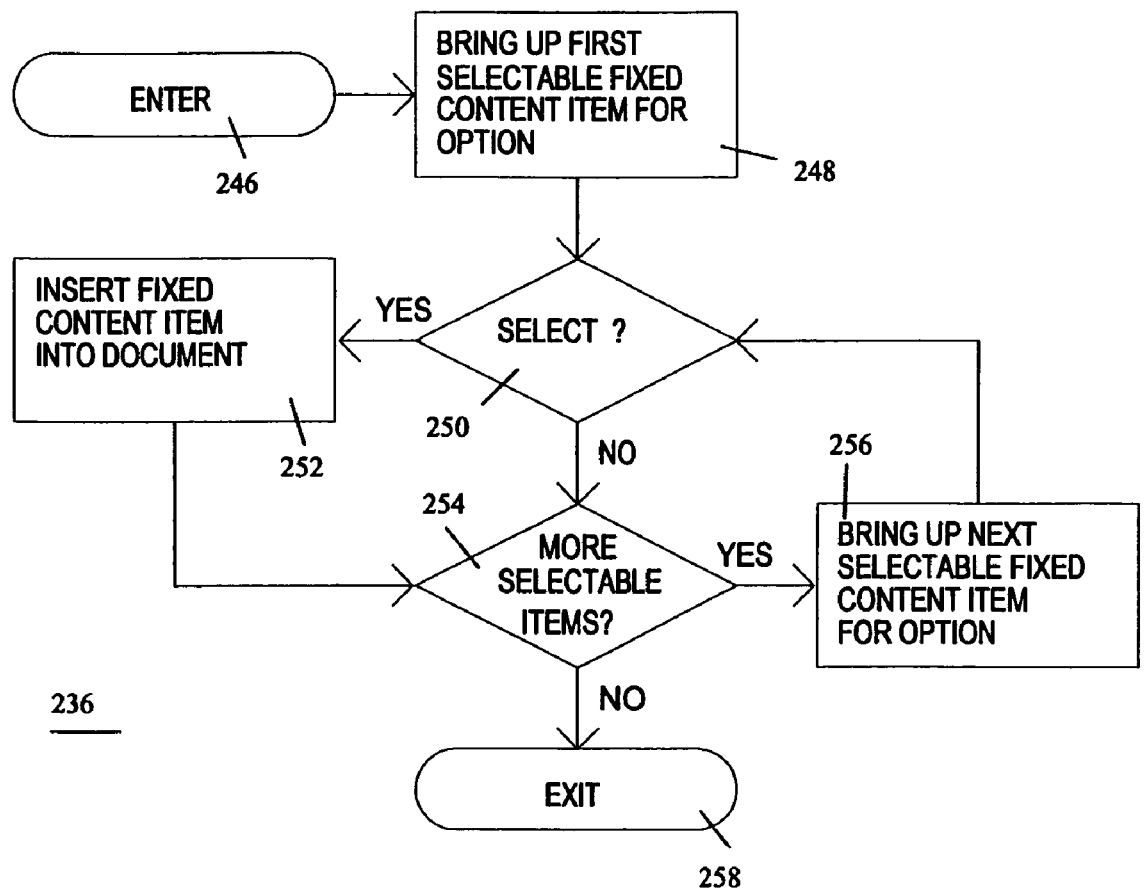
FIG. 12 is a flow chart showing one way in which the operator of the modifying console may be prompted and assisted to select and insert the chosen item from the content option, otherwise shown in FIG. 11.

Attention is next drawn to FIG. 12 which is a flow chart showing one way in which the operator of the modifying console 56 may be prompted and assisted to perform the forty-seventh operation 236 otherwise shown in FIG. 11.

From entry 246 a fiftieth operation 248 has the modifying console 56 bring up and show to the operator the first selectable fixed content item appropriate to the content option being addressed. A twenty-sixth test 250 then looks to see whether the operator of the modifying console 56 selects that particular item. If so, a fifty-first operation 252 inserts the selected fixed content item into the document. The fifty-first operation 252 passes control to a twenty-seventh test 254 which looks to see if there are more selectable items for insertion in response to the particular content option being addressed. The twenty-sixth test 250, if the particular item being displayed is not selected, also passes control to the twenty-seventh test 254.

If the twenty-seventh test 254 detects that there are further fixed content items appropriate for selection for the particular content option being addressed, a fifty-second operation 256 brings up the next selectable fixed content item for the particular option being addressed and causes the modifying console 56 to display that item. The fifty-second operation 256 then passes control to the twenty-sixth test 250 to see if the operator of the modifying console 56 wishes to select that fixed content item for inclusion in the document.

If the twenty-seventh test 254 detects that there are no more selectable items, control passes to exit 258.

The different selectable fixed content items, described in relation to FIG. 12 as being displayed one by one, can, as an alternative, be displayed together and be selected. Likewise, the fixed content options for all of the different content options can be displayed together and also selected.

The operations shown in all of FIGS. 2-12 have been shown and described as occurring in a particular order. The present invention allows that the operations can be performed in other orders than those shown, and can be displayed and selected, processed or added to by an operator using a graphic user interface.

Figure 13:
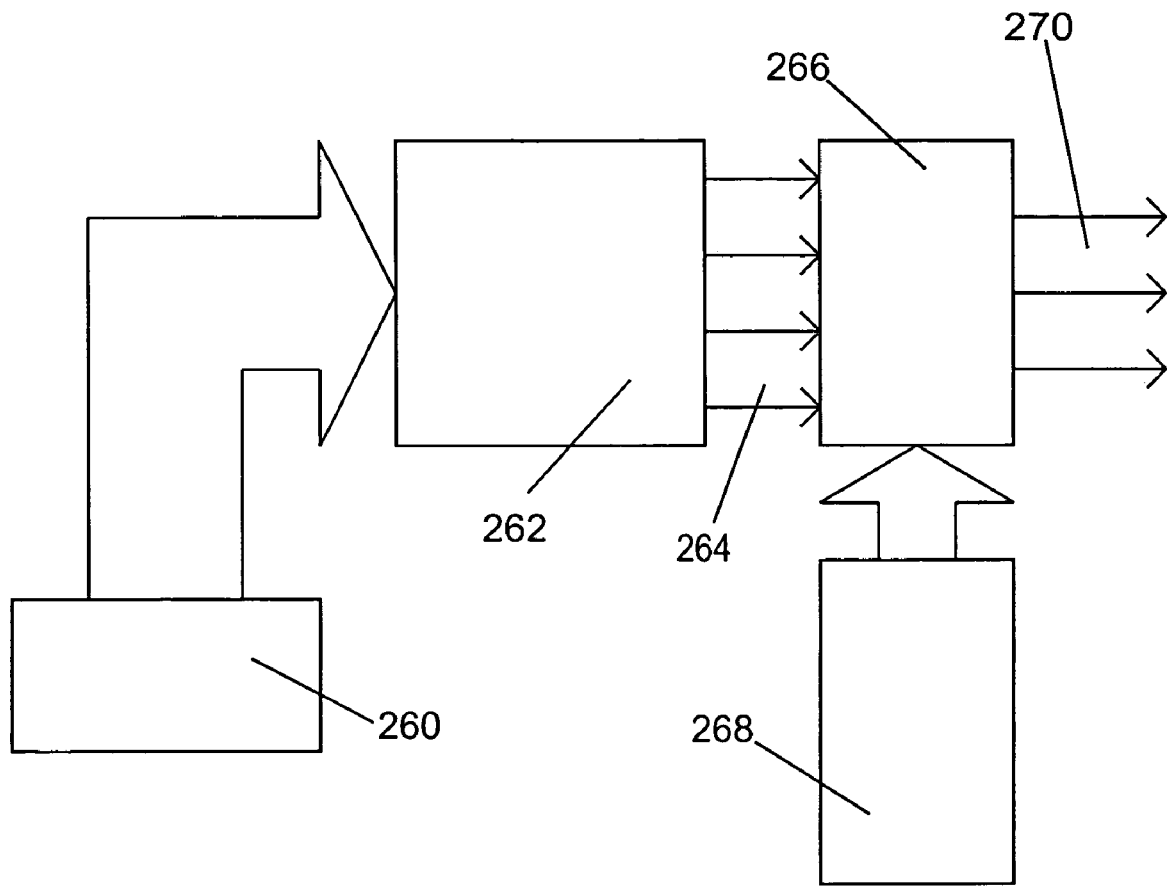
FIG. 13 shows a block diagram of one way in which the present invention can achieve a plain language definition for the criteria.

Attention is next drawn to FIG. 13 showing a block diagram of one way in which the present invention can achieve a plain language means for defining the conditions which are used, for example, in the thirty-seventh operation 204 and the thirty-eighth operation 206 to define how and when a certain fixed content entry will be selected for inclusion in the automatic response. FIG. 13 shows one type of conversion means.

In the fourth operation 66 and the sixth operation 72 otherwise shown in FIG. 2, the compiler of the automated response template defines a criterion. FIG. 13 shows one way in which the criterion can be defined in plain language.

The compiler of the automated response template loads a boolean or otherwise coded language statement into a criterion register 260 which creates and provides a plain language criterion definition, by means of syntactic interpretation and word selection and addition logic, for display to the human user, and also provides the basic definition to linguistic interpretation logic 262 which can take the form of either hard wired logic or an interpretational computer program. The linguistic interpretation logic analyses the basic criterion definition and provides individual state indicating output 264 to memory scanning logic 266 which scans the output of the transactional memory 268 where data from the data store 10 was placed in the twenty-first operation 134 and from which individual data records are extracted during automatic response. The memory scanning logic provides affirmative output 270 whenever a criterion is met and the affirmative outputs 270 are employed to select the appropriate fixed content entry in the formulation of the automatic response.

As just one example of how a criterion definition can be made, the compiler uses a graphical point and click method to create basic criterion definitions. These basic criterion definitions are then stored in JAVA™ or other appropriate computer format. When the basic criterion definitions are re-displayed to the compiler, they are enhanced as plain text and shown in a plain text manner.

FIG. 13 shows just one method and one layout which can be used to achieve the creation, turning into plain language, analysis and application of criterion definitions. The present invention encompasses any other method whereby basic and plain language definitions of a criterion can be interpreted and used to select the activation of a response determined by the definition of the criterion.

Figure 14:
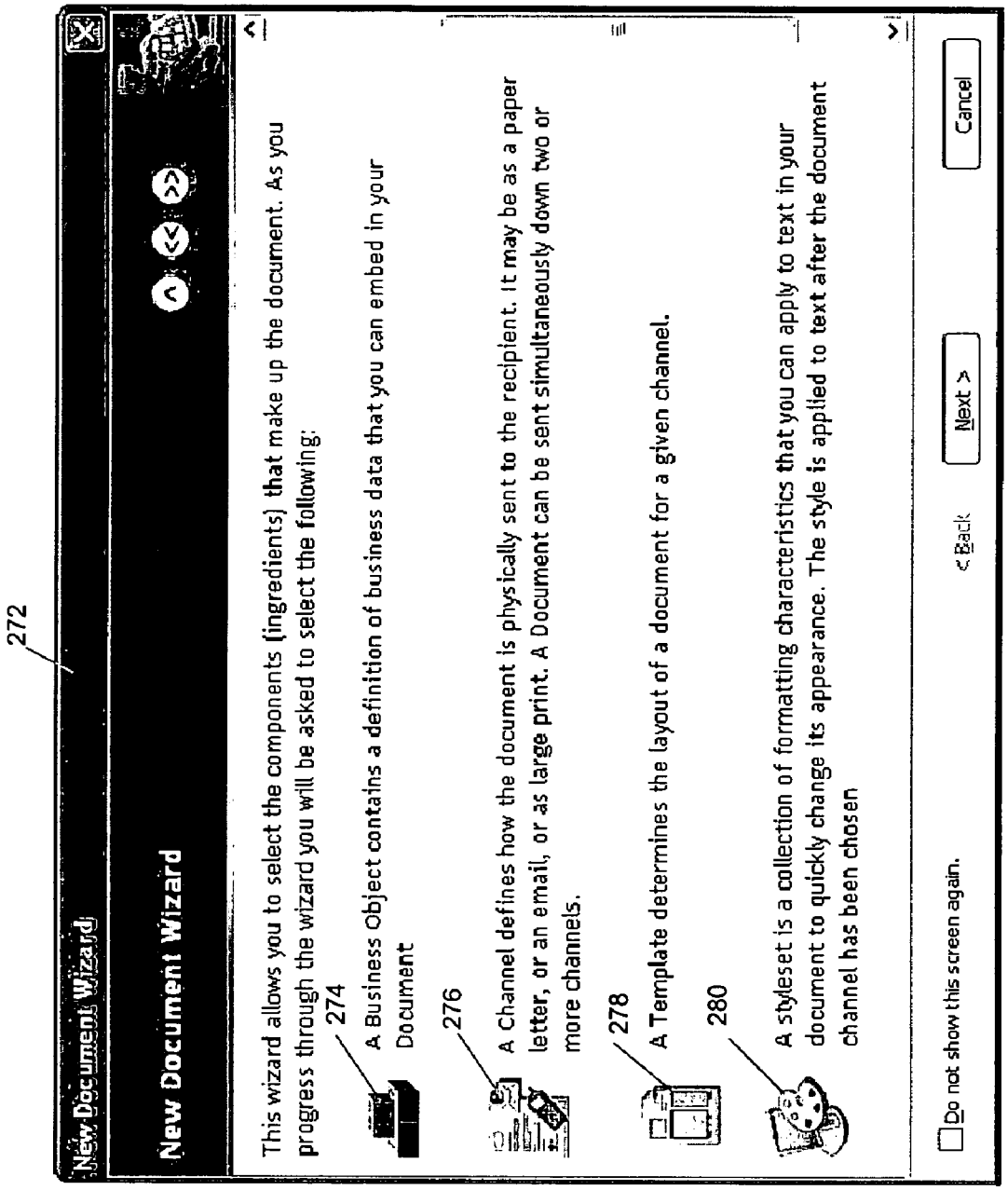
FIG. 14 shows a first screen which is presented to the human response compiler when the compiler is engaged in preparation of a response template.

Attention is next drawn to FIG. 14 which shows a first screen 272 presented to the compiler when the compiler is engaged in the sixteenth operation 116 shown in FIG. 5 where a response template is being prepared.

The first screen 272 commences by defining different terms used in the construction of an automated response. A first term 274 defines a business object. A business object is earlier described with regard to the fifth test 104, the sixth test 106 and the fifteenth operation 108 in FIG. 4. A business object is the definition of the data which is to be inserted into a fixed response element for inclusion in the automated response.

A second term 276 defines a channel. A channel is any one of the many possible means of communication shown as items 12', 18', 22', 52 in FIG. 1 and otherwise referred to with regard to the eighth operation 80 and twelfth operation 96 in FIG. 3 and as the twelfth 156 to eighteenth 180 tests in FIG. 8.

A third term 278 defines a layout template. A layout template defines one or more place holders for content for a specific medium. For example, a "print" layout template can have a placeholder for a logo and address in the top right hand corner of the sheet and another placeholder for the body of the text. As another example, an "Internet" layout template can comprise might have only one placeholder, that being for the body of the text, because the logo appears as part of the web page. A layout template can also comprise static objects or static text.

Contrast the Layout template 278 with the automated response template is described in preparation in FIG. 2, FIG. 3, FIG. 4, and FIG. 5. An automated response template is described in use in the twenty-fourth operation 146 in FIG. 7 and thereafter in FIG. 8, FIG. 9, FIG. 10, FIG. 11 and FIG. 12.

A fourth term 280 defines a styleset. A styleset is the collection of available options and insertions which can be used in a template. Elements of a styleset are earlier referred to with regard to the second operation 62 of FIG. 2 where fixed objects including letterheads and so on are selected, with regard to the third operation 64 of FIG. 2 where invariate objects or text can be inserted, with regard to the ninth operation 82 and the eleventh operation 94 of FIG. 3 where different idioms are usable in the automated response template, and with regard to the twenty-first test 196 and the thirty-fifth operation 198 of FIG. 9.

Figure 15:
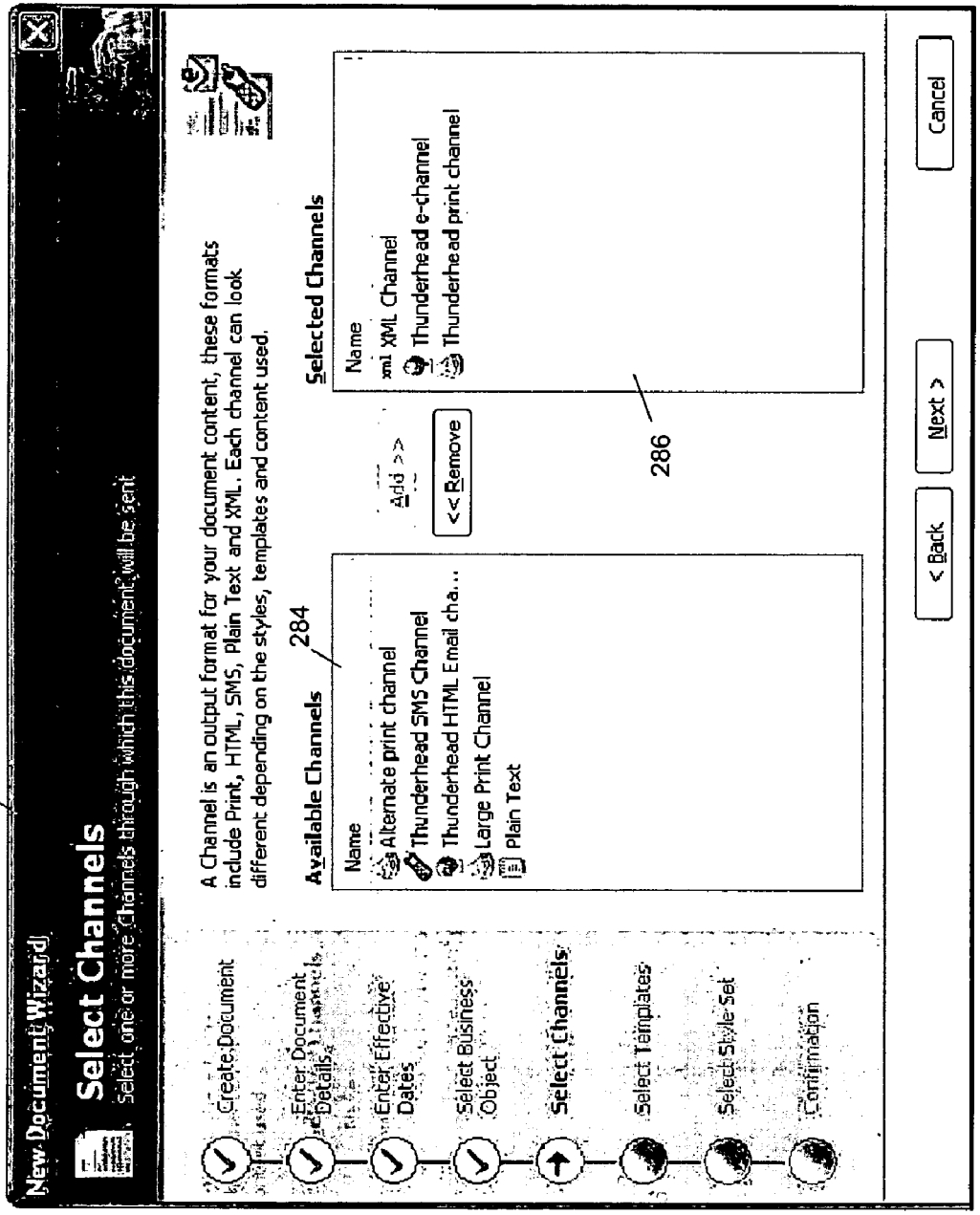
FIG. 15 shows a second screen presented to the compiler as the compiler prepares an automated response template.

Attention is next drawn to FIG. 15 showing a second screen 282 presented to the compiler as the compiler prepares an automated response template.

The second screen 282 comprises a left hand column 284 providing a list of available channels 12', 18', 22', 52 which can be selected in use in the automated response template being prepared. The second screen 282 also provides a right hand column 286 which lists the different channels 12', 18', 22', 52 which the compiler has selected to be used with the automated response template being prepared. The compiler selects an item from the left hand column 284 and transfers it to the right hand column 286 if it is to be used. If an item has erroneously been transferred to the right hand column 286, it can be transferred back to the left hand column 284.

Figure 16:
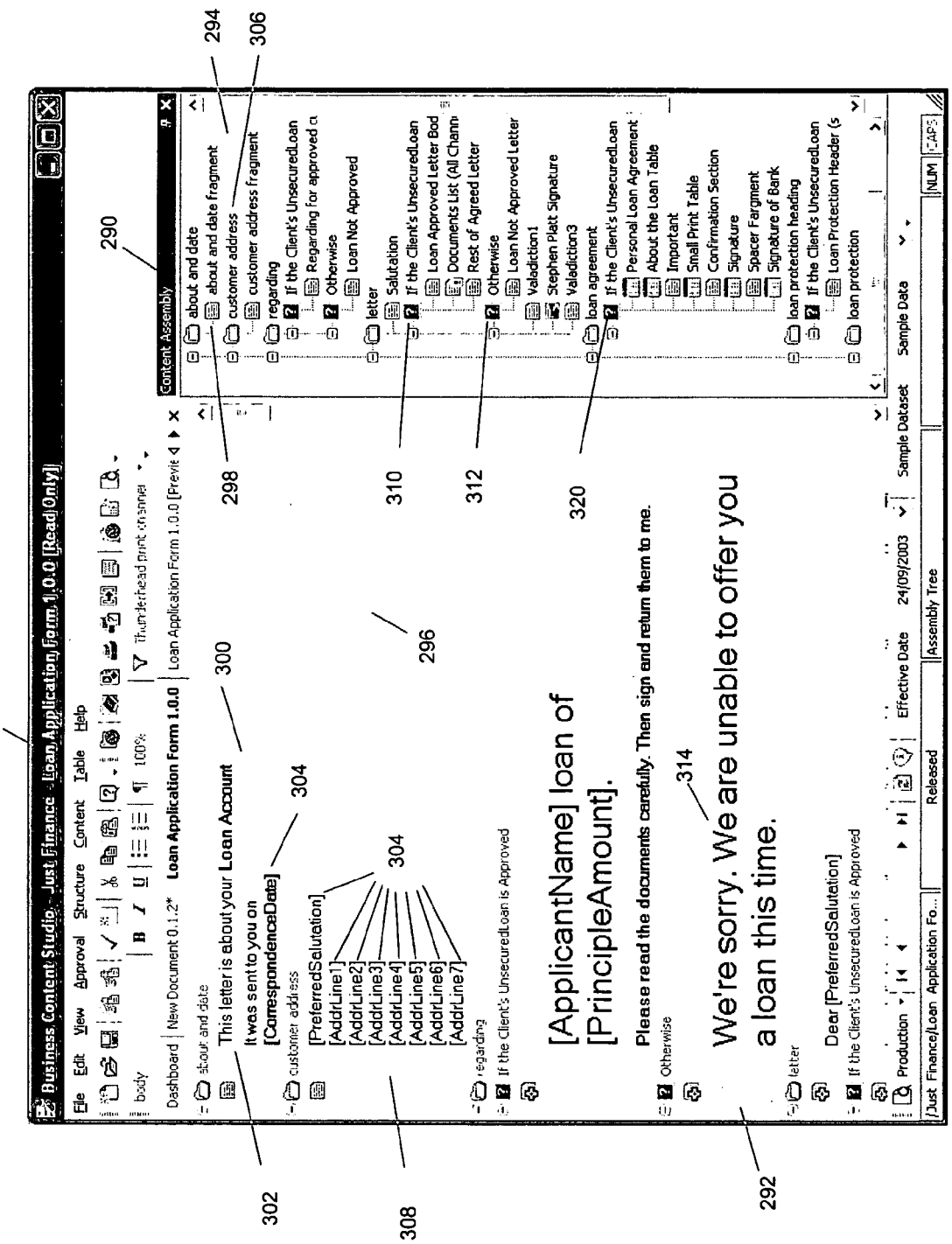
FIG. 16 shows a third screen presented to the compiler of the automated response template as the compiler prepares the automated response template.

Attention is next drawn to FIG. 16 showing a third screen 288 presented to the compiler of the automated response template as the compiler prepares the automated response template.

The third screen 288 presents, to the compiler, a right hand response column 290 and a left hand response column 292.

The right hand response column 290 comprises a content assembly table 294 and the left hand response column 292 contains an exploded detail table 296 showing the fine structure of the elements otherwise disposed in the content assembly table 294.

A first example of an entry in the content assembly table 294 is the "about and correspondence date" entry 298 which is mirrored in the exploded detail table 296 as the exploded "about and correspondence date" entry 300 which contain a fixed element text item 302 which can be amended by the compiler. The fixed text entry is hereinbefore referred to with regard to the fifth operation 68 of FIG. 2 and the fourteenth operation 102 of FIG. 4.

Together with the fixed text entry 302, there is also provided a data insertion definition 304 where an item of data for insertion as described with reference to the fifth test 104 and the fifteenth operation 108 of FIG. 4 is defined by the words enclosed in the bracket and, when the automated response is run, is collected from the data memory 10 via the transaction member 268 to be inserted in the document or response.

In the right hand response column 290 a "customer address" entry appears correspondingly in the left hand response column 292 as an exploded "customer address" entry 308 which comprises further data insertion definitions 304', this time including detail of the preferred salutation and the address lines for that particular automated response recipient.

In the example given, in the right hand response column 290 is a criterion definition 310 referring, in this instance, to "if the client's loan application is approved". The criterion definition relates to the inclusion of criteria referred to with regard to the fourth operation 66, the fifth operation 68, the first test 70 and the sixth operation 72.

Further down on the right hand response column 290 there is an "otherwise" 312 criterion, linked to the criterion definition 310 which defines what is to be done if the criterion definition 310 is not met.

Returning to the left hand response column 292, we are able to see the exploded "otherwise" criterion response text 314.

The right hand response column 290 has the content assembly table 294 organised in a tree structure, readily understood within the usage of computers. The right hand response column 292 has the items in the left hand response column 290 displayed in exploded form and readily accessible to the compiler.

Figure 17:
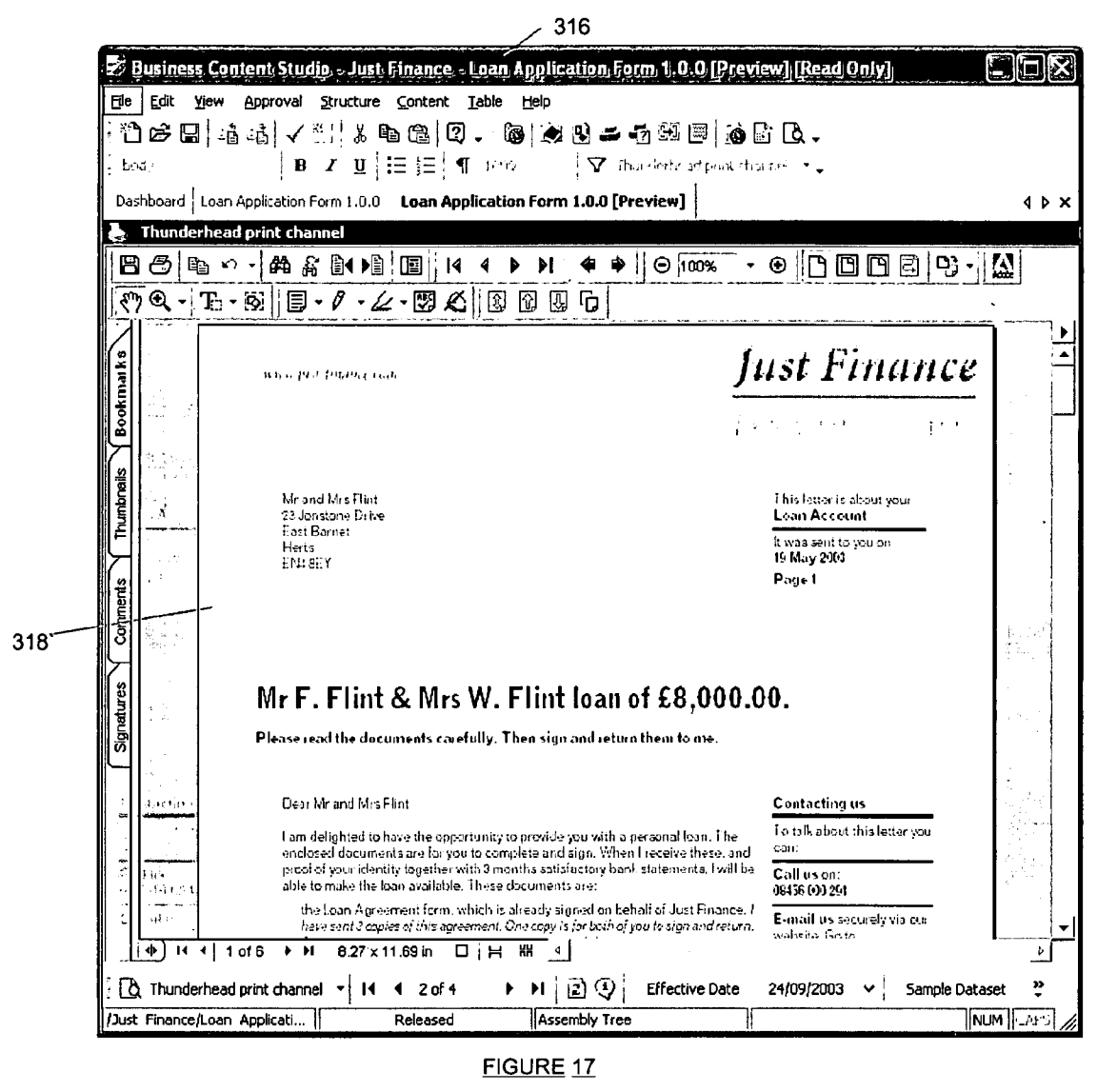

Attention is next drawn to FIG. 17 which shows, by way of an example, a fourth screen 316 which would be presented to the compiler during, for example, testing of the response template according to the seventeenth operation 118 of FIG. 5.

Testing of a response template is achieved by activating the compiled response template, and providing various different data to the response template to see how the response template reacts. If the response template provides an unacceptable response in any instance, the complier can return to the third screen 288 to modify the specification of the automated response. The re-specified automated response can then be re-tested.

All of the elements of FIG. 16 have been incorporated into a response letter 318 in this instance offering a loan that has been applied for under the circumstance that the criterion definition 310 has been met. Attention is next drawn to FIG. 18 which shows further material which is added if a further criterion definition 320 is met.

The criterion definitions 310, 314, 320 can also include statements concerning idioms, language and so on.

Reference is made to our copending applications titled:
"Automatic Communication Method and System" and "Automatic Response Interface"

filed on even date herewith, the disclosures of which are incorporated herein by reference.

The invention claimed is:

1. A method for directing an automatic communication to a recipient, said method including the steps of:
    providing a data store;
    storing data relating to the recipient in the data store;
    examining the data stored and determining that a communication is to be provided to the recipient;
    extracting data relating to the recipient from the data store in response to a determination that a communication is to be provided to the recipient;
    automatically composing an initial communication in response to the data stored in the data store;
    reviewing the initial communication and, passing the initial communication to be modified to become a final communication when stored data extracted when composing the initial communication indicates that human modification is required and, treating the initial communication as the final communication without passing to be modified, when stored data extracted when composing the initial communication indicates that human modification is not required; and
    sending the final communication including any and all modifications to the recipient.

2. A method, according to claim 1, wherein the step of modifying the initial communication comprises modifying the initial communication in a manner selected in response to the data extracted from the data store.

3. A method, according to claim 1, wherein said step of modifying the initial communication comprises at least one of: deleting material from the initial communication; adding new material to the initial communication; providing material of predetermined fixed content and adding the material of predetermined fixed content to the initial communication; providing material of predetermined alterable content and adding the material of predetermined alterable content to the initial communication; and altering material already provided in the initial communication.

4. A method, according to claim 1, comprising the steps of: providing access to a plurality of selectable media for providing the final communication to the individual; selecting, in response to the data extracted from the data store, at least one medium of said plurality of selectable media for providing the final communication to the individual; and employing said at least one medium to send the final communication.

5. A method, according to claim 4, wherein said plurality of selectable media comprises facsimile transmission; telephonic text messaging; data transmission; Internet Communication; and mailing of printed letters.

6. A method, according to claim 2, comprising the steps of: providing access to a plurality of selectable media for providing the final communication to the individual; selecting, in response to the data stored, at least one medium of said plurality of selectable media for providing the final communication to the individual; and employing said at least one medium to send the final communication.

7. A method, according to claim 6, wherein said plurality of selectable media comprises facsimile transmission; telephonic text messaging; data transmission; Internet Communication; and mailing of printed letters.

8. A method, according to claim 1, wherein said step of storing data relating to the recipient in a data store comprises the step of providing access to and accepting data relating to the recipient from at least one of: the Internet; a digital data transmission medium; telephonic text messages; telephonic voice messages; printed matter; data files; and record data files.

9. A method, according to claim 1 wherein said step of automatically composing an initial communication in response to the data stored in the data store comprises the step of providing composition text in a plurality of languages, selecting one of said languages in response to the data stored relating to the recipient and composing the initial communication in the language selected.

10. A method, according to claim 9, wherein said step of modifying the initial communication comprises modifying the initial communication in a same language as a language selected for said initial communication.

11. A method, according to claim 1, wherein said step of automatically composing an initial communication in response to the data stored in the data store includes the step of providing a plurality of idioms for the initial communication and selecting one of said plurality of idioms for the initial communication in response to data relating to the recipient extracted from the store.

12. A method, according to claim 11, wherein said step of modifying the initial communication comprises modifying the initial communication in a same idiom as an idiom selected for said initial communication.

13. A method, according to any one of claims 1-12, wherein said step of automatically composing an initial communication in response to the data stored in the data store includes the step of providing a plurality of forms of composition suitable for use in respective individual jurisdictions; and selecting a particular jurisdiction with the respective form of composition in response to the data relating to the recipient extracted from the store; and, composing the communication in the respective form of composition.

14. A method, according to claim 13, wherein said step of modifying the initial communication comprises modifying the initial communication with material suitable for use in a same jurisdiction as the initial communication.

15. A system for directing an automatic communication to a recipient, said system comprising: a data store for storing data relating to the recipient; examination means for examining the data stored in the data store and determining that a communication is to be provided to the recipient; data extraction means for extracting data relating to the recipient from said data store in response to a determination by said examination means that a communication is to be provided to the recipient; initial communication composition means for composing an initial communication in response to the data stored; modification means for modifying the initial communication to become a final communication; and message transmission means for sending the final communication to the recipient, wherein said modification means is optionally selectively operable in response to the data extracted from the data store.

16. A system, according to claim 15, wherein said modification means is operable to change only a predetermined portion of the initial communication.

17. A system according to claim 15, wherein said modification means is operable in response to the data extracted from said data store to modify the initial communication in a selected manner.

18. A system, according to claim 15, wherein said modification means is operable to perform at least one of: doing nothing to the initial communication; deleting material from the initial communication; adding new material to the initial communication; adding material of predetermined fixed content to the initial communication; adding material of predetermined alterable content to the initial communication; and altering material already provided in the initial communication.

19. A system, according to any claim 15, wherein said initial communication composition means is operable, in response to the data extracted from said data store, to select at least one medium from among a plurality of selectable media for providing the communication to the individual and to compose the communication in a form suitable for use on said at least one medium selected; and wherein said message transmission means is operable to employ said at least one media selected to send the final communication.

20. A system, according to claim 19, wherein said plurality of media includes: facsimile transmission; telephonic text messaging; data transmission; Internet Communication; and mailing of printed letters.

21. A system, according to claim 15, wherein said data relating to the recipient includes data from at least one of: the Internet; a digital data transmission medium; telephonic text messages; telephonic voice messages; printed matter; data files; and record data files.

22. A system, according to claim 15, wherein said initial communication composition means is operable to compose the initial communication in a selectable one of a plurality of languages, the one of the plurality of languages being selected in response to the data relating to the recipient extracted from said data store.

23. A system, according to claim 22, wherein said modification means is operable to modify the initial communication in a same language as a language selected for said initial communication.

24. A system, according to claim 15, wherein said initial communication composition means is operable to select one of a plurality of idioms for the initial communication, the particular idiom being selected in response to the data relating to the recipient extracted from said data store.

25. A system, according to claim 24, wherein said modification means is operable to modify the initial communication in a same idiom as an idiom selected for said initial communication.

26. A system, according to any one of claims 15 and 16 to 25, wherein said initial communication composition means is operable to compose the initial communication in a form suitable for use in a selectable one of a plurality of jurisdictions, the particular one of the plurality of jurisdictions being selected in response to the data relating to the recipient extracted from the data store.

27. A system, according to claim 26, wherein said modification means is operable to modify the initial communication with material in a same form as the form suitable for use in the same jurisdiction as the jurisdiction selected for the initial communication.

28. A method for directing an automatic communication to a recipient, said method including the steps of:
providing a data store;
storing data relating to the recipient in the data store;
examining the data stored and determining that a communication is to be provided to the recipient;
extracting data relating to the recipient from the data store in response to a determination that a communication is to be provided to the recipient;
automatically composing an initial communication with a modifiable portion and an unmodifiable portion in response to the data stored from the data store;
passing the modifiable portion of the initial communication to become a final communication and sending the final communication to the recipient;
wherein said step of passing the modifiable portion of the initial communication to be modified to become a final communication is optional and selectable in response to the data relating to the recipient extracted from the data store.

29. A method for directing an automatic communication to a recipient, said method including the steps of: storing data, relating to the recipient, in a data store; examining the stored data to determine if a communication is to be provided to the recipient; if a communication is to be provided to the recipient, extracting the stored data relating to the recipient from the data store; automatically composing an initial communication in response to the stored data; passing the initial communication to be modified to become a final communication; sending the final communication to the recipient, and wherein said step of passing the initial communication to be modified to become a final communication is optional and selectable in response to the extracted stored data.

30. A system for directing an automatic communication to a recipient, said system comprising: a data store for storing data relating to the recipient;
examination means, operable to examine the stored data extraction means, operable, if said examination means determined that a communication is to be provided to the recipient, to extract the stored data relating to the recipient from said data store;
initial communication composition means, operable to compose an initial communication in response to the stored data;
modification means, operable to modify the initial communication to become a final communication;
message transmission means, operable to send the final communication to the recipient, and
wherein said modification means is optionally selectably operable in response to the extracted stored data.

* * * * *